US006839665B1

(12) United States Patent
Meyers

(10) Patent No.: US 6,839,665 B1
(45) Date of Patent: Jan. 4, 2005

(54) AUTOMATED GENERATION OF TEXT ANALYSIS SYSTEMS

(75) Inventor: Amnon Meyers, Laguna Beach, CA (US)

(73) Assignee: Text Analysis International, Inc., Sunnyvale, CA (US)

( * ) Notice: Subject to any disclaimer, the term of this patent is extended or adjusted under 35 U.S.C. 154(b) by 479 days.

(21) Appl. No.: 09/604,836

(22) Filed: Jun. 27, 2000

(51) Int. Cl.[7] .......................... G06F 17/27; G06F 17/30
(52) U.S. Cl. ............................................... 704/9; 707/6
(58) Field of Search ................................ 707/6, 5, 4, 1; 706/59, 58, 45; 704/9; 382/229, 161, 157

(56) References Cited

U.S. PATENT DOCUMENTS

| | | | | |
|---|---|---|---|---|
| 5,696,962 A | * | 12/1997 | Kupiec | ............................ 707/4 |
| 5,796,926 A | | 8/1998 | Huffman | ....................... 395/77 |
| 5,841,895 A | | 11/1998 | Huffman | ..................... 382/155 |
| 5,963,940 A | * | 10/1999 | Liddy et al. | .................... 707/5 |
| 6,208,987 B1 | * | 3/2001 | Nihei | ............................ 707/3 |

OTHER PUBLICATIONS

Charniak, E., Tree–bank Grammars, Jan. 1996, Department of Computer Science, Brown University, pp. 1–12.*
Soderland, "Learning Information Extraction Rules for Semi–structured and Free Text," Machine Learning, 1999, vol. 34, pp. 1–44.*
Kim, J.T. et al., "Acquisition of Semantic Patterns for Information Extraction from Corpora", Proceedings of the Conference on Artificial Intelligence for Applications, Department of Electrical Engineering Systems, University of Sourthern California, pp. 171–176 (1993).
Hahn, U. et al., "SYNDIKATE—Generating Text Knowledge Bases from Natural Language Texts", Conference Proceedings, IEEE International Conference on Systems, Man, and Cybernetics, pp. 918–923 (1999).

International Search Report.

Krupka, G.R., "SRA: Description of the SRA System as Used for MUC–6," Sixth Message Understanding Conference, Nov. 6–8, 1995, pp. 221–235, Sponsored by Defense Advanced Research Projects Agency, Information Technology Office, Tipster Text Program.

* cited by examiner

*Primary Examiner*—Richemond Dorvil
*Assistant Examiner*—V. Paul Harper
(74) *Attorney, Agent, or Firm*—Gray Cary Ware & Friedenrich LLP

(57) ABSTRACT

A system, method, and computer program for automatically generating text analysis systems is disclosed. Individual passes of a multi-pass text analyzer are created by generating rules from samples supplied by users. Successive passes are created in a cascading fashion by performing partial text analyses employing existing passes. A complete text analyzer interleaves the generated passes with a framework of existing passes. The complete text analysis system can then process texts to identify patterns similar to samples added by users. Generation of rules from samples encompasses a wide range of constructs and granularities that occur in text, from individual words to intrasentential patterns, to sentential, paragraph, section, and other formats that occur in text documents.

4 Claims, 13 Drawing Sheets

FIG. 12

```
# AUTOMATICALLY GENERATED ! EDITS WILL BE LOST !
# FILE: D:\apps\Resume\spec\phoneNumber.pat
# TIME: Sun Jan 16 18:12:53 2000
@NODES_LINE
@PRE
<3,3> length(1)
<6,6> length(3)
<8,8> length(3)
<10,10> length(4)
@RULES
# Ex: (+1)\_321\_357\_8740
_phoneNumber <-
    xWILD [min=1 max=1 s match=(_openPunct \()]
        \(+|s]
    xWILD [min=1 max=1 trig s layer=(_countryCode)
        match= (_monthNum 1)]
    xWILD [min=1 max=1 s match=(_closePunct \))]
    xWHITE [star s]
    xNum [s layer=(_areaCode)]
    xWHITE [star s]
    xNum [s layer=(_prefix)]
    xWHITE [star s]
    xNUM [s layer=(_suffix)]
@@
```

FIG. 19

AUTOMATED GENERATION OF TEXT ANALYSIS SYSTEMS

BACKGROUND OF THE INVENTION

Text analysis is an area of computer science that focuses on processing text to extract information through pattern recognition. The decade of the 1990's has seen an unprecedented explosion in work on learning methods for text analysis. Prior text analysis methods rely on unsupervised learning, where the system is responsible for teasing generalizations from texts or samples. One such system, the HASTEN system described in "SRA: Description of the SRA System as Used for MUC-6," Krupka, George R., pp. 221–235, Proceedings Sixth Message Understanding Conference (MUC-6), November 1995 (referred to herein as Krupka). Krupka teaches a system for grouping text samples supplied and labeled by users and creating data structures called e-graphs. The system in Krupka then uses a similarity metric to decide if portions of an input text are related to e-graphs that have been created. It applies these collections of e-graphs, called collectors, as sequential processing phases, in order to match each sample set to the input text. Generalization of the elements of e-graphs is performed manually by the developer. There is no notion of generating grammar rules from e-graphs. The work does not establish a method for converting the collectors to rule-based passes of a text analyzer. The work does not describe a way to automatically generate substantial portions of a text analyzer. The system in Krupka requires a large amount of user interaction to perform tasks manually beyond adding and labeling samples, and was applied specifically to create an event level pattern for MUC text analysis. However, Krupka's system does not teach a general and fully automated text analyzer capability.

Another text analysis system is disclosed in Huffman (U.S. Pat. Nos. 5,796,926 and 5,841,895). The Huffman patents deal with text extraction at the event level and teach methods for locating potential event patterns of interest. In essence, Huffman teaches a rigid, inflexible method of searching for specific patterns such as "actor acts on object."

There is a need for a system that automatically generates text analysis systems with minimal training samples while retaining sufficient intelligence to recognize patterns beyond those described by the training samples, sufficiently flexible to allow adaptation to a variety of applications.

SUMMARY OF THE INVENTION

An embodiment of the present invention includes a generator program 106 that utilizes a hierarchy of user-supplied samples and a text analyzer framework to create complete text analyzer programs. The hierarchy and framework are related in that the top-level concepts of the hierarchy are associated with stubs, or empty regions of passes, in the text analyzer framework. The generator program fills these stub regions with text analyzer passes generated from samples in the hierarchy. A user guides the conversion of the samples to generalized rules for recognizing not only the given samples, but also related patterns that are processed at a later time. Users may supply additional samples in order to process novel patterns that were not anticipated when the initial text analyzer was created. When a text analysis system according to the present invention fails to identify a pattern, a user can simply highlight the unrecognized sample in text and label its components, if necessary, to enable the generator to create a new text analyzer that now recognizes the new sample and related samples processed at a later time. Rather than using a similarity metric, an embodiment of the present invention applies rules that have been automatically generated from samples.

BRIEF DESCRIPTION OF THE DRAWINGS

FIG. 12 illustrates a user interface that allows a user to operate the generator program;

FIG. 19 illustrates a sequence of steps placed into a stub region by the generator, along with the rules generated for one of the steps.

DETAILED DESCRIPTION

Figure 1:
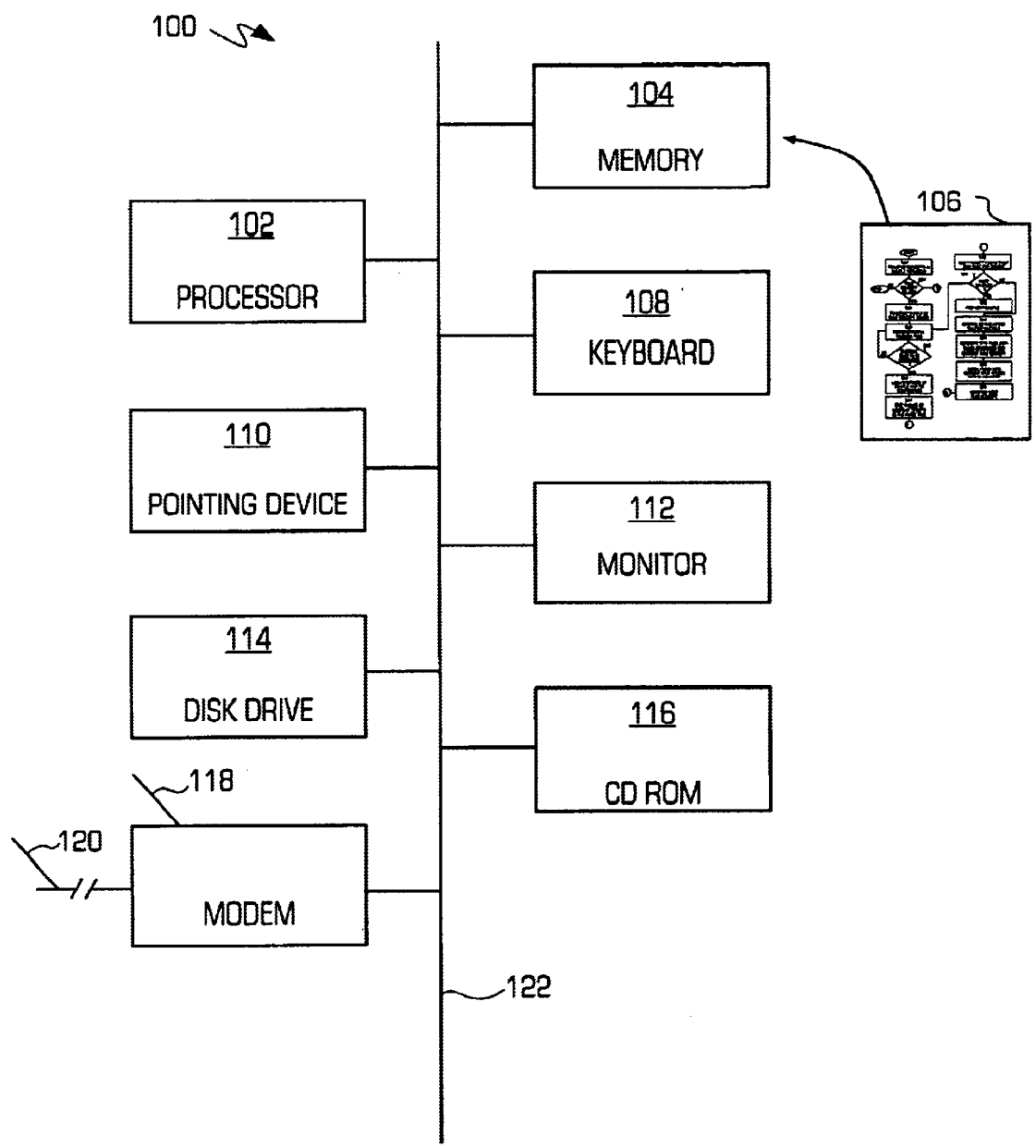
FIG. 1 is an illustration in block diagram form of various components of an embodiment of the present invention.

Directing attention to the drawings, FIG. 1 is a high level block diagram of the hardware typically used in an embodiment of the present invention. Computer 100 may have a conventional design, incorporating a processor 102 utilizing a central processing unit (CPU) and supporting integrated circuitry. Memory 104 may include RAM and NVRAM such as flash memory, to facilitate storage of computer programs executed by processor 102, such as generator program 106. Also included in computer 100 are keyboard 108, pointing device 110, and monitor 112, which allow a user to interact with program 106 during execution. Mass storage devices such as disk drive 114 and CD ROM 116 may also be incorporated in the computer 100 to provide storage for generator program 106 and associated files. Computer 100 may communicate with other computers via modem 118 and telephone line 120 to allow generator program 106 to be operated remotely, or utilize files stored at different locations. Other media may also be used in place of modem 118 and telephone line 120, such as a direct connection or high speed data line. The components described above may be operatively connected by a communications bus 122.

Generator program 106 produces text analyzer programs by generating rules from samples supplied by users to create individual passes of a multi-pass text analyzer. A sample is a piece of text that users have decided is a unit of interest, such as a name or idiomatic phrase. A sample hierarchy is an index for storing all user-added samples. A rule is a representation for a pattern of interest, which may include associated actions to ensure that the pattern has matched correctly and to record the match in the parse tree. A rule typically associates a concept with a pattern or phrase. When the pattern matches a list of nodes, the matched nodes of the parse tree are condensed or reduced to a node associated with the concept.

As used herein, a pass is one step of a multi-step analyzer, in which the generator program 106 traverses a parse tree to execute a set of rules associated with the pass. As used herein, a parse tree is a tree data structure constructed and maintained by the generator program 106 to organize text and all the patterns that have been recognized within the text. Successive passes are created in a cascading fashion by performing partial text analyses employing existing passes. The resulting text analyzer program interleaves the generated passes with a framework of existing passes. The complete text analysis system can then process text to identify patterns similar to samples added by users. Generation of rules from samples encompasses a wide range of constructs and granularities that occur in text, from individual words to intrasentential patterns (such as a grammar), to sentential, paragraph, section, and other formats that occur in text documents.

To exemplify the methods and data structures of the present invention, we use simple telephone number patterns such as $$497\text{-}5318 \;(949)\; 497\text{-}5318 \;\text{Home:}\; (949)\; 497\text{-}5318 \tag{1}$$

Figure 2:
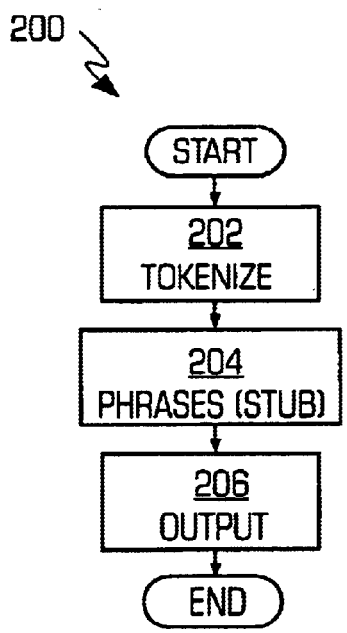
FIG. 2 is a flow chart illustrating the steps executed by a text analyzer program produced by the present invention.
Figure 3:
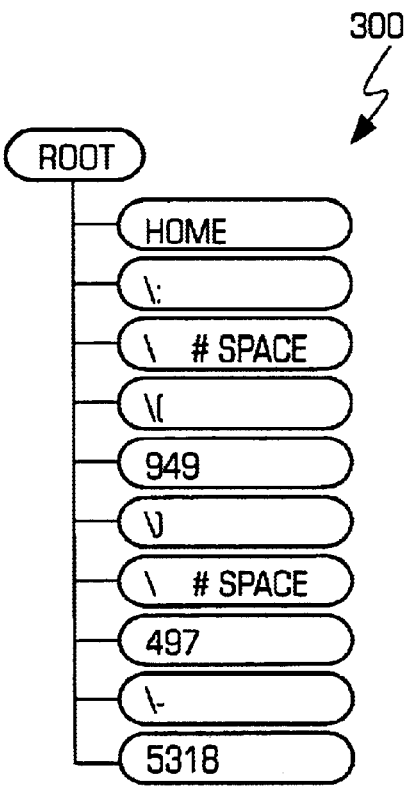
FIG. 3 is an illustration of a parse tree data structure created and maintained by the present invention.

FIG. 2 shows a resulting text analyzer program produced by an embodiment of the present invention. Text analyzer program 200 contains three passes. The first pass, tokenize (202), processes an input text to group the characters according to alphabetic, numeric, white space, and punctuation units, referred to herein as tokens. The tokens are all placed into a parse tree data structure 300 (FIG. 3). The parse tree 300 is used and modified by subsequent passes. The phrases pass (204) is a stub, or empty placeholder, for the passes that the generator program 106 creates using user-supplied samples in a sample hierarchy. Since there are no passes there initially, this placeholder pass has no effect on the parse tree 300. Finally, the output pass (206), displays a representation of the parse tree 300.
Given the sample input text:

$$\text{Home:}\; (949)\; 497\text{-}5318 \tag{2}$$

The output pass displays the parse tree 300 as illustrated in FIG. 3.

Figure 4:
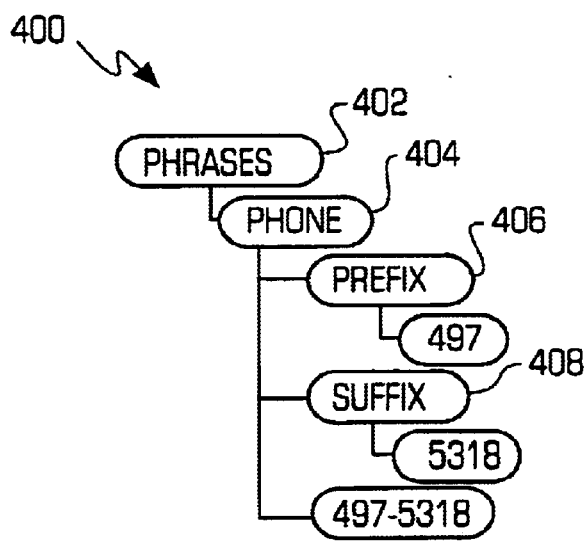
FIG. 4 shows a sample hierarchy constructed and used by the present invention.

Text analyzer program 200 has no knowledge of telephone number patterns. If a user wants phone numbers to be grouped under a concept called phone, a sample hierarchy as shown in FIG. 4 can be constructed. This hierarchy of samples 400 has a top-level stub concept called phrases 402, which matches the stub region 204 to be filled within the text analyzer 200. The user creates a rule concept called phone 404, in order to place telephone number samples under it. Under the rule concept 404, the user places telephone number samples such as "497-5318" and labels their components with the arbitrary names prefix 406 corresponding to "497" and suffix 408 corresponding to "5318," which are referred to herein as label concepts 410. Such samples can be added in a simple fashion with a user interface that allows highlighting the complete text and its components.

Figure 5:
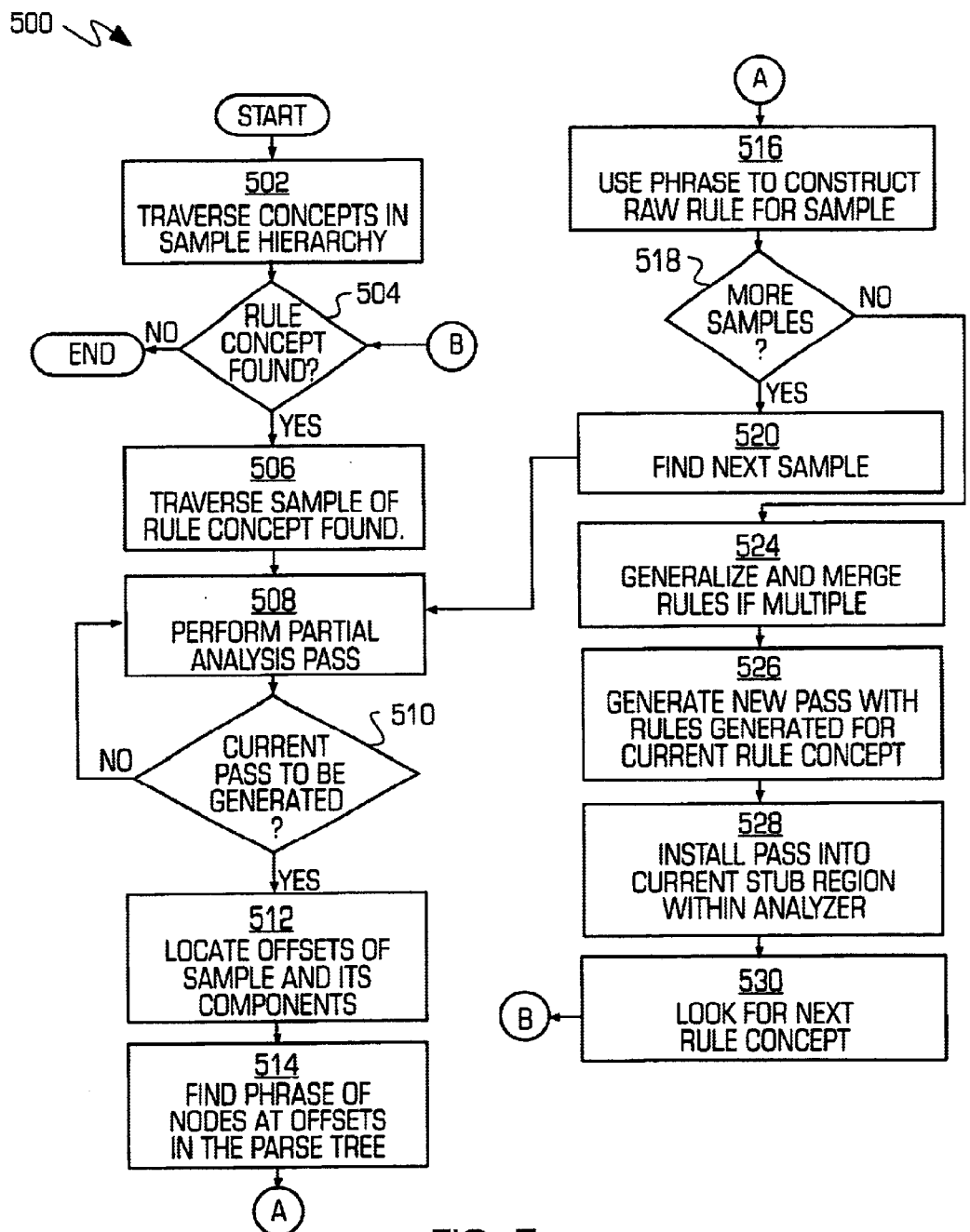
FIG. 5 is a flow diagram illustrating the major steps of rule generation and rule merging according to methods of the present invention.

Generator program 106 can be invoked to generate a new analyzer by executing the sequence of steps 500 illustrated in the FIG. 5. Generator program 106 first traverses the sample hierarchy 400 to find the rule concept called phone 404 (step 502). If a rule concept is found (decision step 504), it traverses the samples corresponding to the rule concept found, encountering the phone number 497-5318 (step 506). The generator program 106 executes a partial analysis (step 508) of the text containing the current sample. Because a pass will be generated for the current rule concept, the partial analysis stops just before the pass to be created. (See decision step 510.) In our simplified example, the partial analysis consists only of the tokenize pass 202, so that is what the generator program 106 executes. Partial analysis involves applying the partially built text analyzer, containing passes constructed so far, to the text containing the samples used to build the current pass. Partial analysis is conducted in an iterative fashion. Continuing to step 514, the generator program 106 locates the position of the current sample within the parse tree that has been constructed so far (FIG. 3), based on the offsets of the sample within its entire text (step 512). Going back to the example, "(949) 497-5318" has a start and end offset in the text that it appears in, for example 0 to 13, if it is in the beginning of a text file. Looking in the parse tree later in the parse, the phrase that covers this range of offsets now appears "(949)_phone." Each part or node of the parse tree has a start and end offset. The "_phone" portion accounts for characters 6 through 13. The generator program 106, in building a complete phone rule, uses whatever phrase it finds in the parse tree 300 at the range of offsets from 0 to 13. In the parse tree 300, the generator program 106 finds the tokens $$497\backslash\text{-}5318 \tag{3}$$

It therefore generates [step 516] the raw rule based precisely on what is represented in the parse tree, as follows:

$$\_phone\text{<-}497\backslash\text{-}5318\; @@ \tag{4}$$

The underscore before phone indicates that this is a non-literal concept. The <- arrow indicates a rewrite of the phrase to the right with the concept to the left. The @@ marker denotes the end of the rule. The backslash preceding the dash means that this dash is to be taken literally, rather than being part of the rule language. At this point, the generator program 106 can attach labeling information to the first element ("497") and the last element ("5318") of the phrase, as prefix and suffix, as follows:

$$\_phone\text{<-}497[label=\_prefix]\backslash\text{-}5318[label=\_suffix]\;@@ \tag{5}$$

Figure 6:
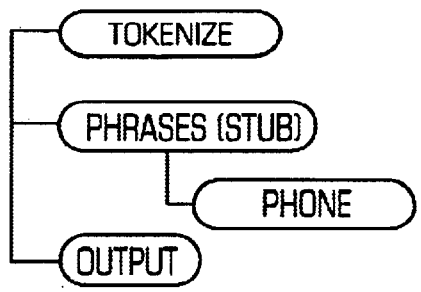
FIG. 6 is an illustration showing the addition of a pass to the sequence of steps executed by the text analyzer produced by the present invention.
Figure 7:
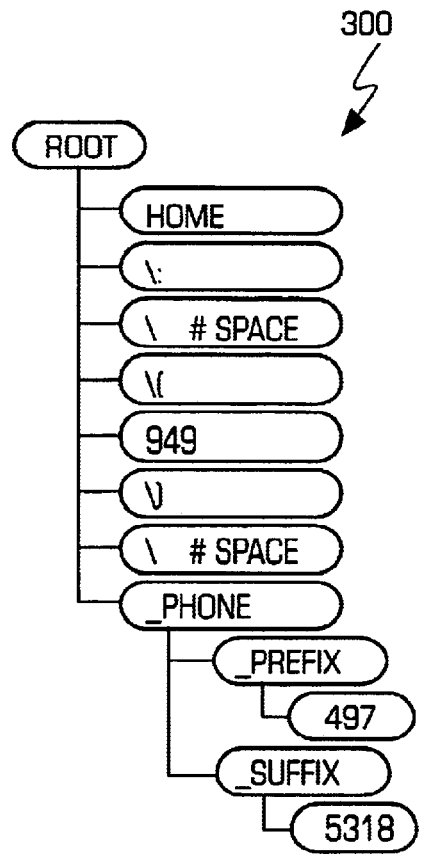
FIG. 7 is an illustration of a parse tree data structure modified by a partial analysis step performed by the present invention.
Figure 8:
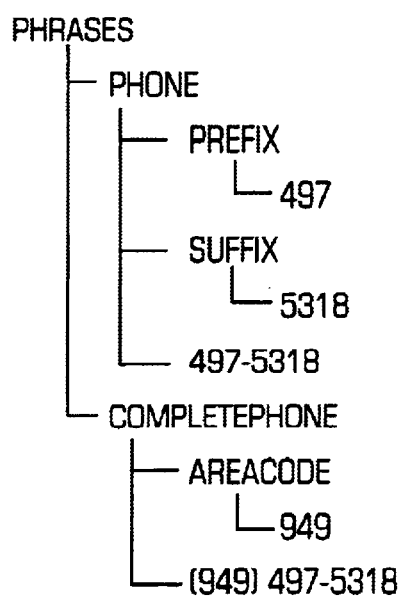
FIG. 8 is an illustration of an updated sample hierarchy.

Since there are no other samples (decision step 518) under the phone concept, the generator program 106 has no opportunity to merge and compare samples. Having finished with the samples under this rule concept, the generator program 106 at step 526 creates a new pass called phone for the rule set it has generated (consisting of one rule in this case). The generator program 106 then adds the new pass to the analyzer sequence (step 528), as shown in FIG. 6. The generator program 106 then looks for the next rule concept at step 530. Had there been additional rule concepts with samples in the sample hierarchy, (step 520) control would return to step 508, where the generator program 106 would have proceeded to analyze the overall text from which those samples derived. It would perform a partial analysis up to and including the pass called phone. For the given text, the resulting parse tree data structure 700 is shown in FIG. 7. Note that the tokens "497", "-" and "5318" have been replaced in the parse tree by the single token "_phone". Now let us suppose that the user adds a second sample to the hierarchy, under a new concept, yielding the sample hierarchy shown in FIG. 8.

Had the phone concept not been in this sample hierarchy, the generator program 106 would have built the rule $$\_completePhone<- \backslash(949\ [label=areaCode]\backslash)\backslash497\backslash-5318@@ \quad (6)$$

But because the phone sample is also present and the generator program 106 has installed the phone pass within the analyzer, the generator program 106 is given parse tree 550 (FIG. 7) when constructing the rule for completePhone. Therefore, the generator program 106 builds the following rule:

$$\_completePhone<-\backslash(949\ [label=areaCode]\backslash)\_phone@@ \quad (7)$$

Figure 9:
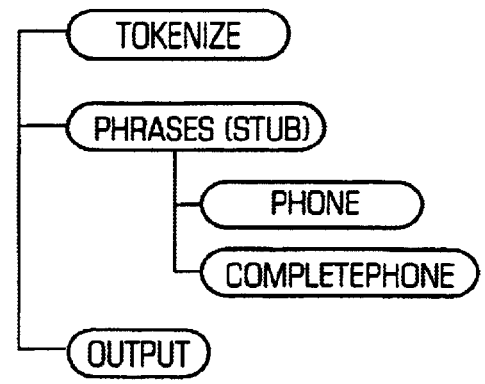
FIG. 9 shows the addition of a second pass to the sequence of steps executed by the analyzer.
Figure 10:
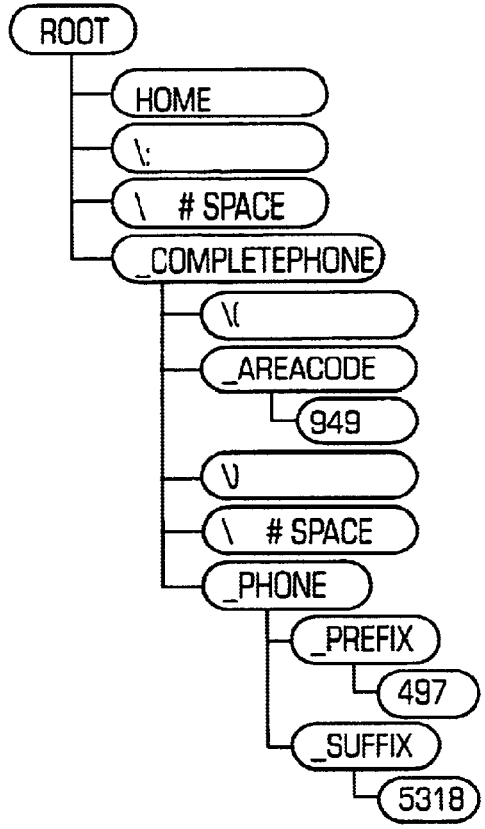
FIG. 10 is an illustration of a parse tree data structure modified by a second partial analysis step performed by the present invention.

The product of the prior automatically-generated pass is used in building the rules for the current pass called completePhone. The generator program 106 has now built an analyzer for phone numbers that follows the passes illustrated in FIG. 9. In this example, the phone pass and completePhone pass each contain one rule. This analyzer with two automatically generated passes produces the parse tree in FIG. 10 from the sample input text in (2). Generator program 106 automatically creates the passes of a text analyzer in stepwise fashion, each time using the sequence of passes constructed so far in order to create the next pass of the analyzer. It adds each new pass to a backbone of manually built and previously generated passes.

The discussion above describes the generation of one pass per rule concept. Additional modes, specified by the user who constructs the sample hierarchy, enable the rules generated for multiple rule concepts to be merged into a single large pass (step 524), in order to both optimize performance and to enable more sophisticated rule generation that identifies and unifies ambiguous constructs. For example, if "New York" is listed under a rule concept city and a rule concept state, then a unified treatment of these rule concepts can enable the generation of rules such as:

$$\_city[label=\_state]<-New\ York@@ \quad (8)$$

which condenses instances of "New York" to both a city concept and a state concept in a parse tree.

Optimizations

Executing the generator program 106 can be computationally expensive, because each sample in the sample hierarchy requires the text containing it to be partially analyzed, in order to generate the rule corresponding to the sample. Generator program 106 can be modified to keep track of instances where multiple samples under a rule concept derive from the same text. In those cases, the given text need be partially analyzed only once, in order to glean the RAW rules for all the samples that derived from that text.

In a preferred embodiment, further optimization may be achieved when generator program 106 places user-added samples into a single sample file. Thus, each rule file has an associated sample file. The sample file may be stored in memory 104, disk drive 114 or CD Rom 116. In this way the number of partial text analyses is reduced for a sample hierarchy with many samples. Further optimizations are to generate passes when their complement of samples has changed. While there is a danger that some subsequent pass may not be updated correctly due to dependencies on the current pass, most of the time this method of generation (generate dirty) is adequate for rapid development and testing. Occasionally, a generate all function may be invoked to rebuild every single pass, thus making sure that all passes that need updating will get updated.

Rule Generalization and Merging

Figure 11A:
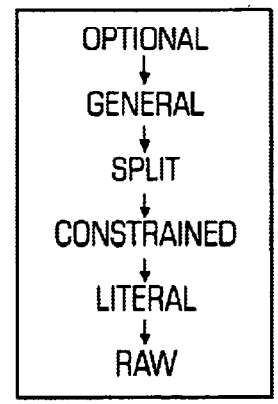
FIG. 11A illustrates the relationship of various types of rules in the generator program.
Figure 11B:
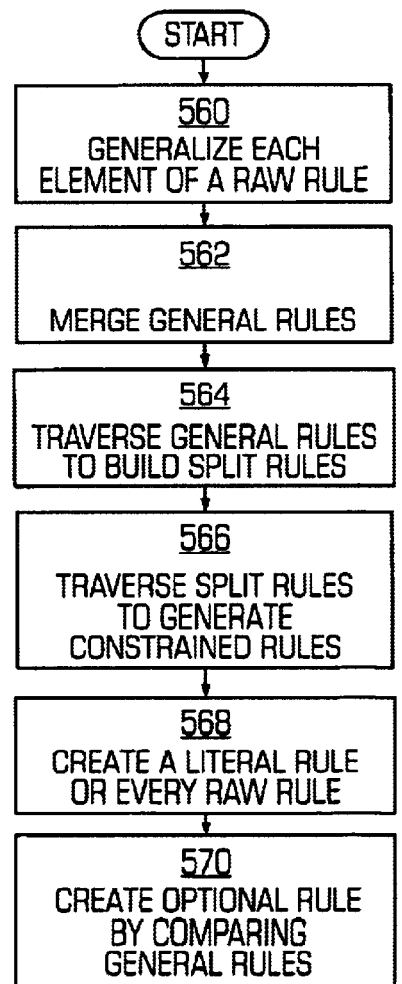
FIG. 11B illustrates the logical sequence of steps for generalizing and merging rules.

A preferred embodiment of the present invention also has the capability to generalize and merge raw rules generated directly from samples as illustrated in FIG. 5 at step 524. One sample is usually not sufficient to derive or generalize rules. At least two samples of any given pattern are required in order to deduce the more general pattern. When multiple samples are available under a rule concept, the rule generalization and merging method is invoked at step 524 to build a variety of rule sets: literal, general, optional, split, and constrained. The hierarchy shown in FIG. 11A, and the flow diagram in FIG. 11B, best describe the relationships among these rule sets.

At step 560, for each raw rule generated (one per sample), the generator program 106 creates a general rule by iteratively generalizing each element of the raw rule. For example, "497" will be generalized to NUMBER, "Home" will be generalized to ALPHABETIC, "-" to PUNCTUATION, and " " to WHITESPACE. At step 562, generator program 106 merges general rules that have identical elements and length. The general rule for "497-5318" will be identical to that for "555-1212," namely $$\_phone<-\_NUMBER\_PUNCTUATION\_NUMBER@@ \quad (14)$$

Therefore the rules for the two samples are merged under this general rule. The general rule retains a list of all the raw rules that gave rise to it. At step 564, generator program 106 traverses the general rules to build the split rules. The split rules require that all raw rules have consistent labeling. So a split rule may appear:

$$\_phone<-\_NUMBER\ [label=\_prefix]\_PUNCTUATION\_NUMBER\ [label=\_suffix]@@ \quad (15)$$

At step 566, generator program traverses the split rules to generate the constrained rules. Constrained rules are rules whose raw rules all have consistent features, such as length and capitalization.

A constrained rule may appear:

$$\_phone<-\_NUMBER[label=\_prefix\ length=3]\_PUNCTUATION\_NUMBER[label=\_suffix\ length=4]@@ \quad (16)$$

The above rule constrains the first number to have three digits and the second number to have four digits. At step 566, generator program 106 creates a literal rule for every raw rule. The literal rule is constructed by looking "inside" each element of the phrase as deeply as can be seen in the parse tree. For example, if a raw rule appears _phone<- _LIST(NUMBER 497)\-_LIST(NUMBER 5318 )@@ (17)

the literal rule produced is

_phone<-497\-5318@@ (18)

At step 570, generator program 106 creates optional rules by comparing the composition of general rules that differ by one element. If that element is not a labeled element, then the two general rules can be merged, with the difference element marked as optional.

By embellishing a sample hierarchy with particular attributes, the manner in which rules are generated is controlled. The need to collect large sample sets in order to calculate statistically plausible generalizations is eliminated. Attributes may be specified to indicate what is to be generalized, what is to be collected as a list, and what is to be retained literally. For example, one attribute may instruct the generator program 106 to always generalize whitespace to a rule element that allows an arbitrary number of space characters. Another attribute may designate a label concept as "closed," meaning any samples within it are to be collected into a list of only those samples, with no generalization. Other flags control the rule sets to be retained for the pass being generated. If the "constrain" flag is set to "true," then the constrained list of rules is retained by the generator program 106. Retaining a rule set involves placing it into the final list of rules for the pass under construction. An enhancement to the sample hierarchy is to enable the described attributes to control the way rules are generated for an entire subtree. If some concept within that subtree changes an attribute's value, then that new value controls its subtree, and so on recursively.

A nonexhaustive set of attributes may be utilized to allow a user to control the rule sets to be retained in each pass of the analyzer, as below:

| Attribute | Values | |
|---|---|---|
| GENERAL | true/false | |
| SPLIT | true/false | |
| CONSTRAINED | true/false | |
| RAW | true/false | |
| LITERAL | true/false | (19) |

The above attributes cause the generator program 106 to retain or discard the corresponding rule sets. For example, if a concept in the sample hierarchy has the constrained attribute set to true, then all the constrained rules generated in that subhierarchy will be retained as part of the final analyzer. An attribute called closed, also with true/false values, controls the way parts of samples are collected into rules. For example, given the samples 497-5318 555-1212 (20)

if the closed attribute is set to true, then the corresponding constrained phone rule appears _phone<-_LIST(497 555)\-_LIST(5318 1212)@@ (21)

That is, each element of the pattern is a "closed set," which collects any values found in the set of samples. If the CLOSED attribute is set to false, the constrained rule is _phone<- _NUMBER[label=_prefix length=3]_PUNCTUA-
TION _NUMBER[label=_suffix length=4]@@ (22)

Because white space and punctuation are often secondary in importance, a WHITE attribute with values true/false can specify that whitespace in samples generalizes to the rule element _WHITE[min=0 max=infinity] (23)

that is, any number of white spaces, regardless of the particular type and number of whitespace characters in the set of samples.

Other attributes can control the actions that get built for the generated rules and their components. For example, a QUICKSEM attribute with values true/false generates actions for semantic information to be copied automatically when a rule matches text. In the phone number example, the QUICKSEM attribute would cause the automatic creation of a data item called "prefix" with value "497" and a second data item called "suffix" with value "5318" in the _phone node, given that the _phone rule matched a text string such as "497-5318." The LABEL (or LAYER) attribute takes a name as its value and leads to the generation of a label action in the associated rules that get generated.

User Interface

Figure 12:
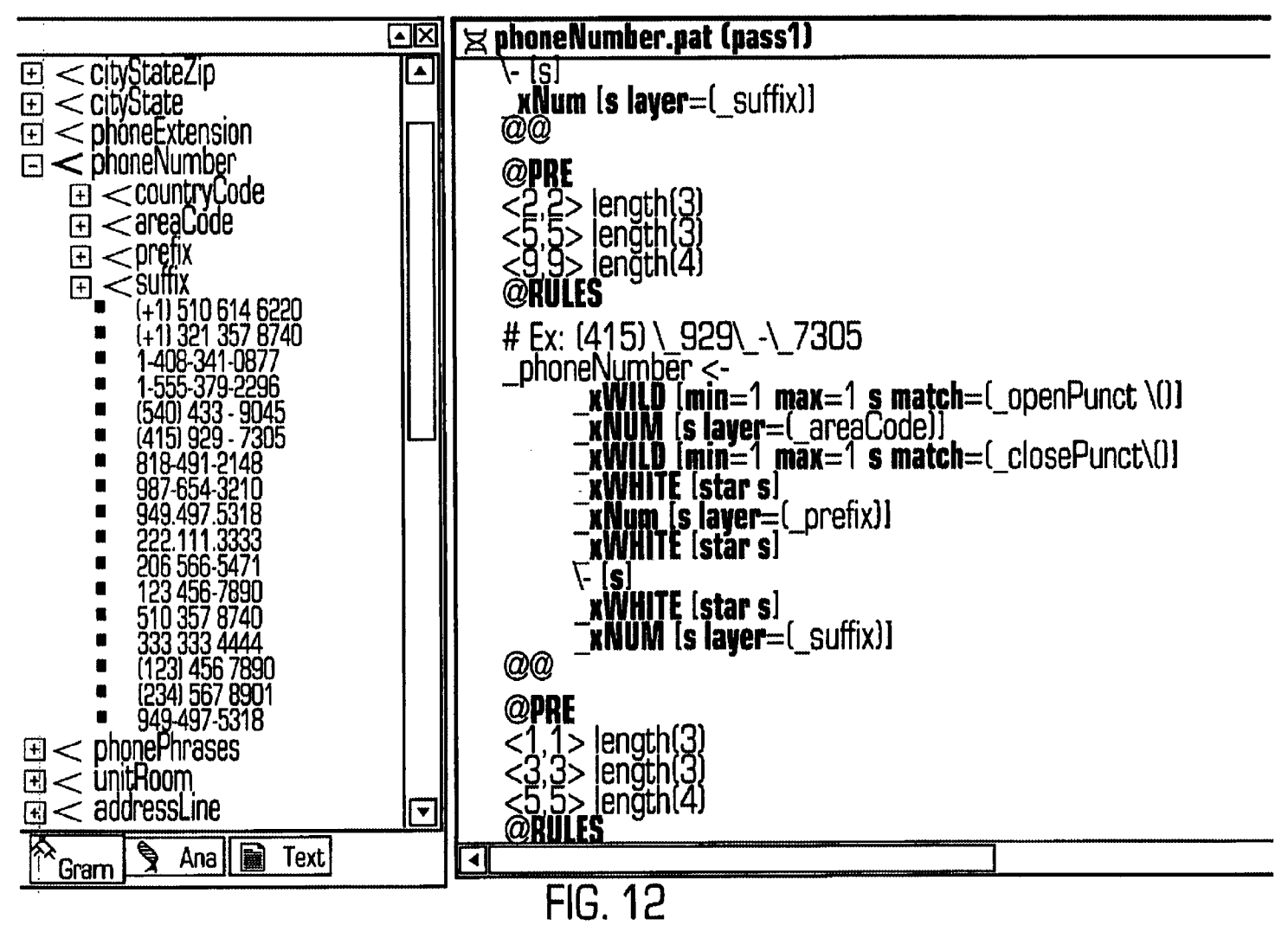

FIG. 12 illustrates a user interface 600 that allows a user to operate the generator program 106. The left panel 602 displays the sample hierarchy 604 with phoneNumber concept 606 selected. The right panel 608 displays the rule file automatically generated for the phoneNumber concept. The partial hierarchy file listing below details the commands for building the concepts of the sample hierarchy for a generator program 106 configured to process resumes. Each line builds one concept (the listing does not distinguish among organizing concepts, rule concepts, and label concepts). Each concept can have an arbitrary number of samples assigned to it by a user. While most of the samples for the generator program 106 are smaller than a sentence (intrasentential), the method and system of the present invention apply to paragraphs and sections of texts as well as to intrasentential patterns.

"concept" "gram" "LiteralPhrase" "HeaderPhrase"
"concept" "gram" "LiteralPhrase" "HeaderPhrase" "ContactHeaderPhrase"
"concept" "gram" "LiteralPhrase" "HeaderPhrase" "ObjectiveHeaderPhrase"
"concept" "gram" "LiteralPhrase" "HeaderPhrase" "EducationHeaderPhrase"
"concept" "gram" "LiteralPhrase" "HeaderPhrase" "ExperienceHeaderPhrase"
"concept" "gram" "LiteralPhrase" "HeaderPhrase" "SkillsHeaderPhrase"
"concept" "gram" "LiteralPhrase" "HeaderPhrase" "PresentationsHeaderPhrase"
"concept" "gram" "LiteralPhrase" "HeaderPhrase" "PublicationsHeaderPhrase"
"concept" "gram" "LiteralPhrase" "HeaderPhrase" "ReferencesHeaderPhrase"
"concept" "gram" "LiteralPhrase" "HeaderPhrase" "OtherHeaderPhrase"
"concept" "gram" "LiteralPhrase" "Others"
"concept" "gram" "LiteralPhrase" "Others" "degreeInMajor"
"concept" "gram" "LiteralPhrase" "Others" "WebLinks"
"concept" "gram" "LiteralPhrase" "Others" "emailHeader"
"concept" "gram" "LiteralPhrase" "Others" "minorKey"
"concept" "gram" "LiteralPhrase" "Caps"

Figure 13:
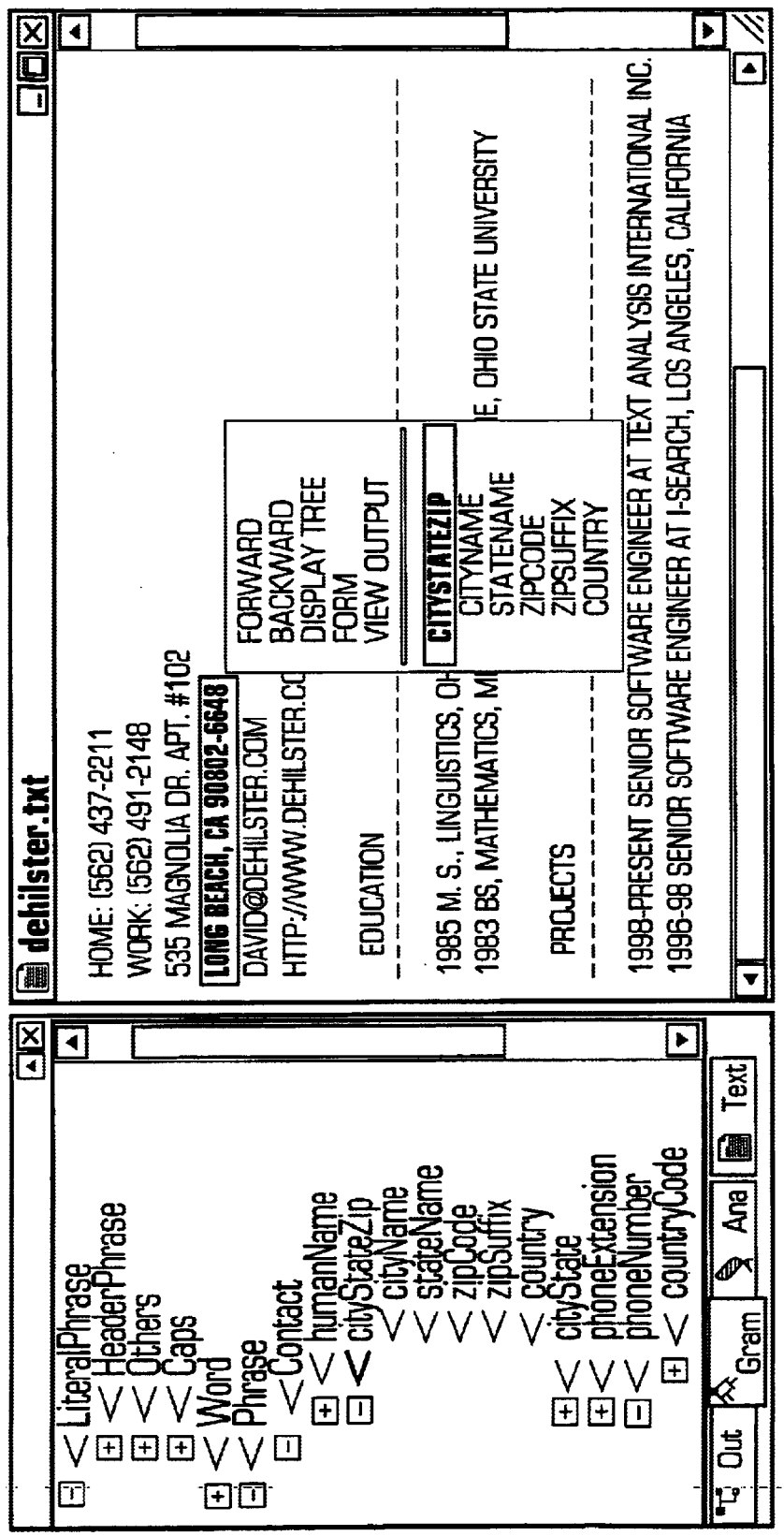
FIG. 13 illustrates the association of a text sample with the sample hierarchy.
Figure 14:
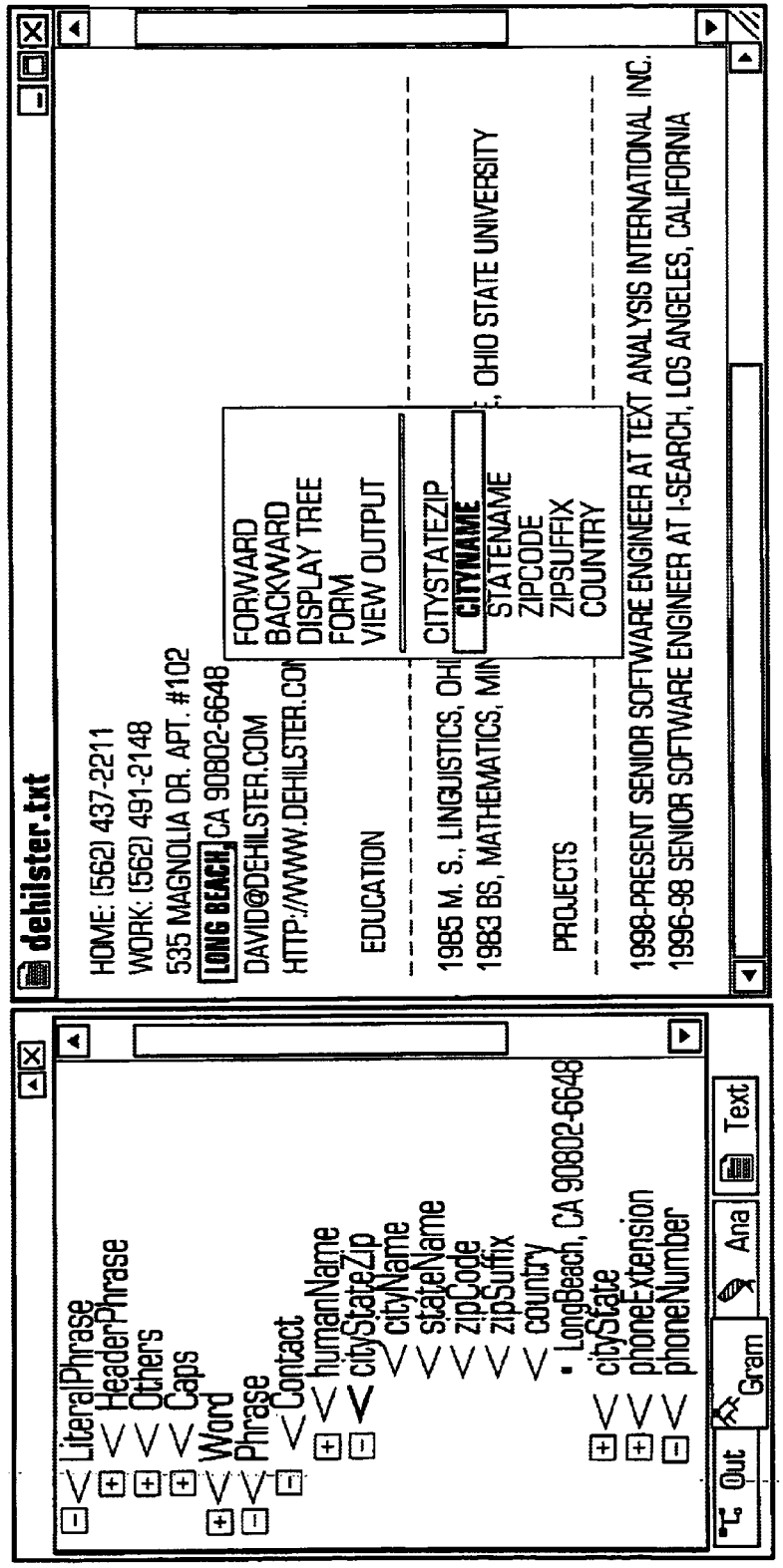
FIG. 14 illustrates how a user labels the components a sample via the user interface.

"concept" "gram" "LiteralPhrase" "Caps" "cityPhrase"
"concept" "gram" "LiteralPhrase" "Caps" "statePhrase"
"concept" "gram" "LiteralPhrase" "Caps" "companyPhrase"
"concept" "gram" "LiteralPhrase" "Caps" "degreePhrase"
"concept" "gram" "LiteralPhrase" "Caps" "countryPhrase"
"concept" "gram" "LiteralPhrase" "Caps" "skillsPhrase"
"concept" "gram" "LiteralPhrase" "Caps" "naturalLanguages"
"concept" "gram" "LiteralPhrase" "Caps" "software"
"concept" "gram" "LiteralPhrase" "Caps" "hardware"
"concept" "gram" "LiteralPhrase" "Caps" "certifications"
"concept" "gram" "LiteralPhrase" "Caps" "field"
"concept" "gram" "LiteralPhrase" "Caps" "Thesis"
"concept" "gram" "LiteralPhrase" "Caps" "jobTitle"
"concept" "gram" "LiteralPhrase" "Caps" "jobPhrase"
"concept" "gram" "Word"
"concept" "gram" "Word" "Syntax"
"concept" "gram" "Word" "Syntax" "posPREP"
"concept" "gram" "Word" "Syntax" "posDET"
"concept" "gram" "Word" "Syntax" "posPRO"
"concept" "gram" "Word" "Syntax" "posCONJ"
"concept" "gram" "Word" "HeaderWord"
"concept" "gram" "Word" "HeaderWord" "ContactHeaderWord"
"concept" "gram" "Word" "HeaderWord" "ObjectiveHeaderWord"
"concept" "gram" "Word" "HeaderWord" "EducationHeaderWord"
"concept" "gram" "Word" "HeaderWord" "ExperienceHeaderWord"
"concept" "gram" "Word" "HeaderWord" "SkillsHeaderWord"
"concept" "gram" "Word" "HeaderWord" "PresentationsHeaderWord"
"concept" "gram" "Word" "HeaderWord" "PublicationsHeaderWord"
"concept" "gram" "Word" "HeaderWord" "ReferencesHeaderWord"
"concept" "gram" "Word" "HeaderWord" "Ot Machinery for Adding and Managing Samples While a command line interface may be utilized by an embodiment of the present invention, the preferred embodiment utilizes a graphical user interface (GUI) to manage the sample hierarchy. A specialized pull-down menu enables rapid highlighting and labeling of samples and their components within a text. By selecting a concept in the sample hierarchy and then highlighting a text, the highlighted text sample is placed under the sample hierarchy concept, as in FIG. 13. Once the user adds the overall sample, he can proceed to add labels (i.e., components of the overall sample), as illustrated in FIG. 14. As shown in FIG. 14, the user highlights and labels "Long Beach" as a cityName.

Figure 15:
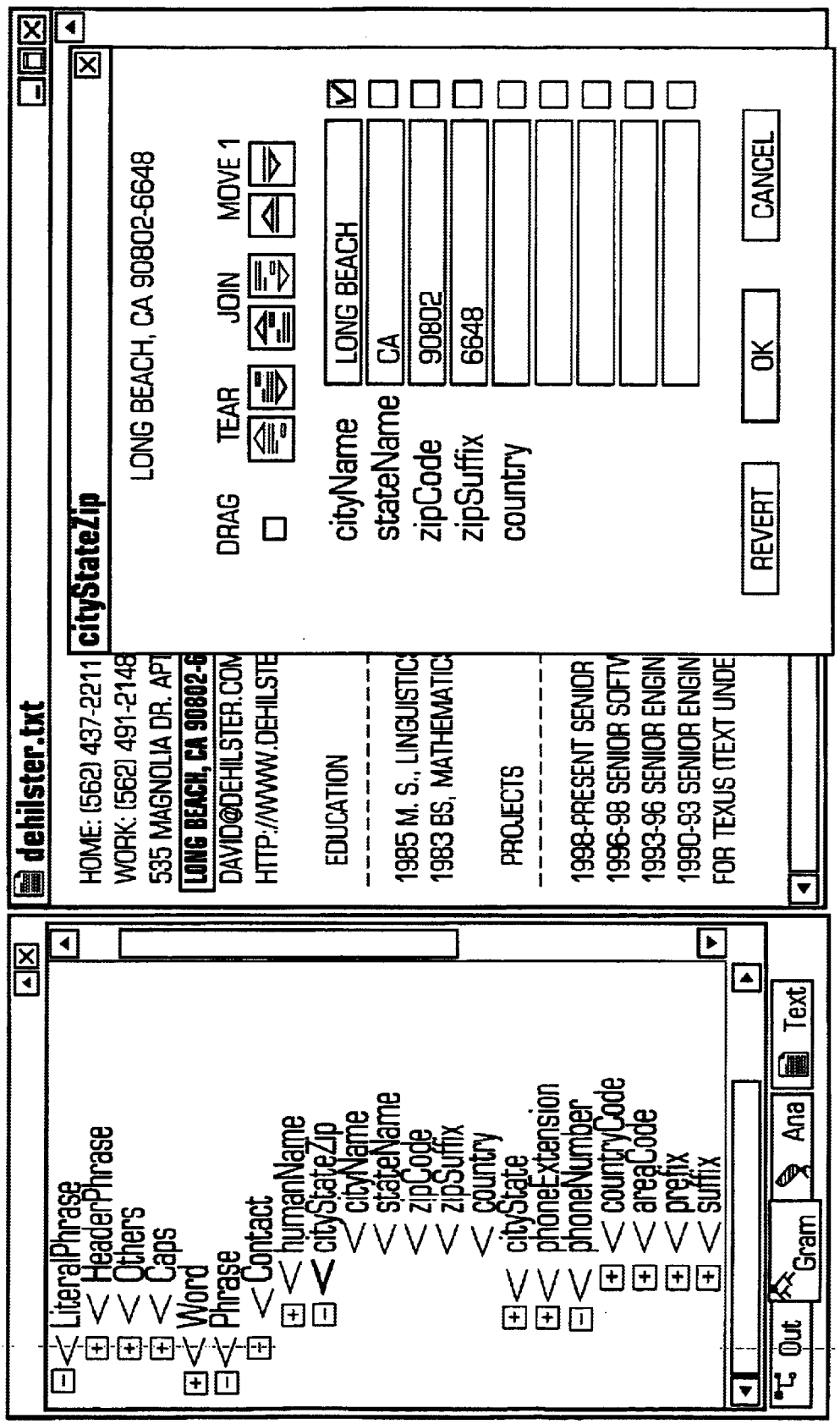
FIG. 15 illustrates a form tool used in connection with the generator program.

In another aspect of the user interface of the present invention, a form tool 580 (FIG. 15) accelerates and organizes the addition of a sample and labeling of its components by enabling a user to quickly group the textual components of a sample so that they will be properly labeled. Form tool 580 minimizes the need to use the mouse for highlighting a sample text and each of its components. Merely by clicking arrows in the form tool 580, the user can rearrange the components of the overall sample so that they are grouped and labeled properly. The form tool 580 can also serve as a locus for specifying information about a sample and for guiding the generation of rules and actions from the sample.

Figure 16:
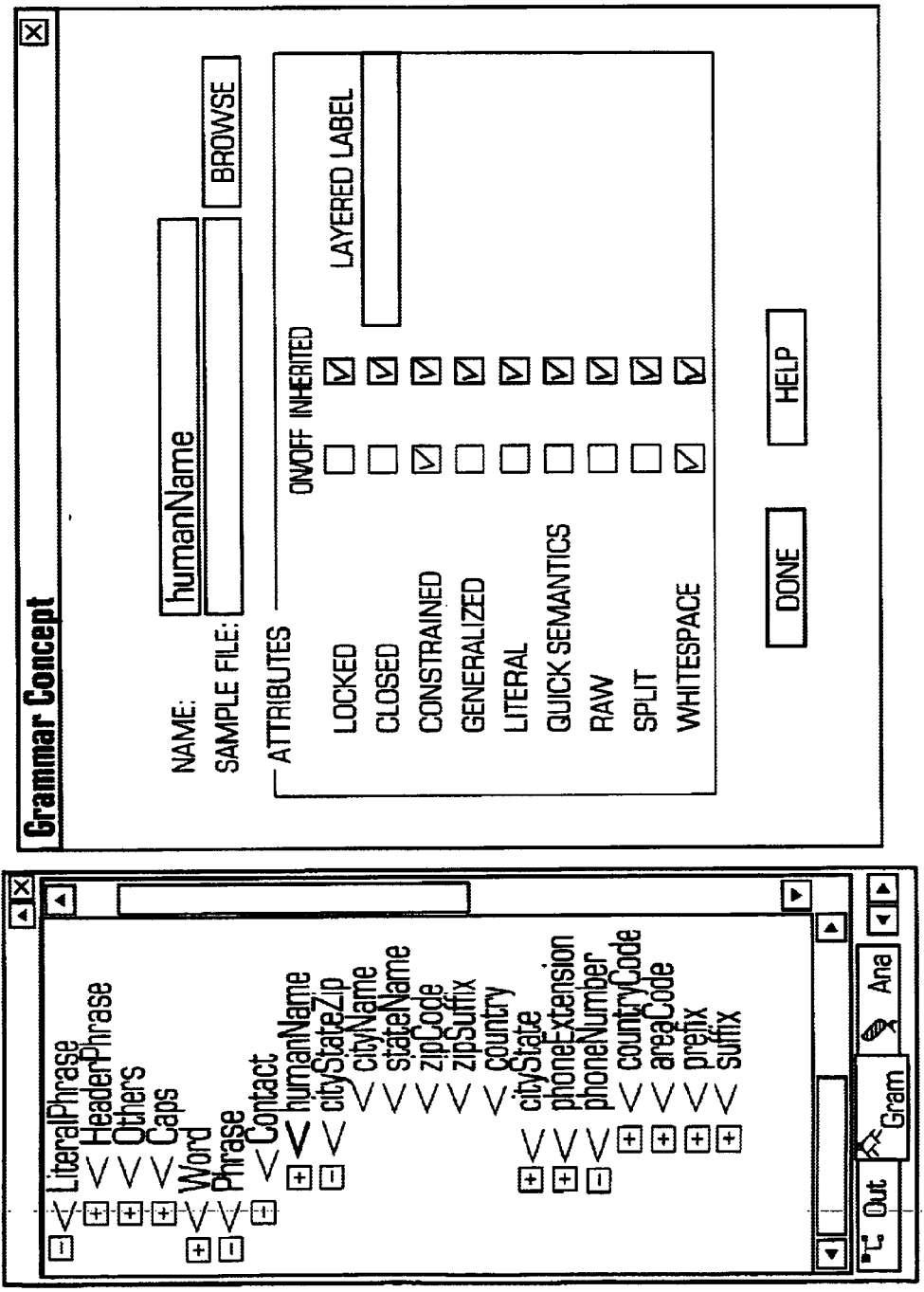
FIG. 16 illustrates the properties window used in connection with the user interface.
Figure 17:
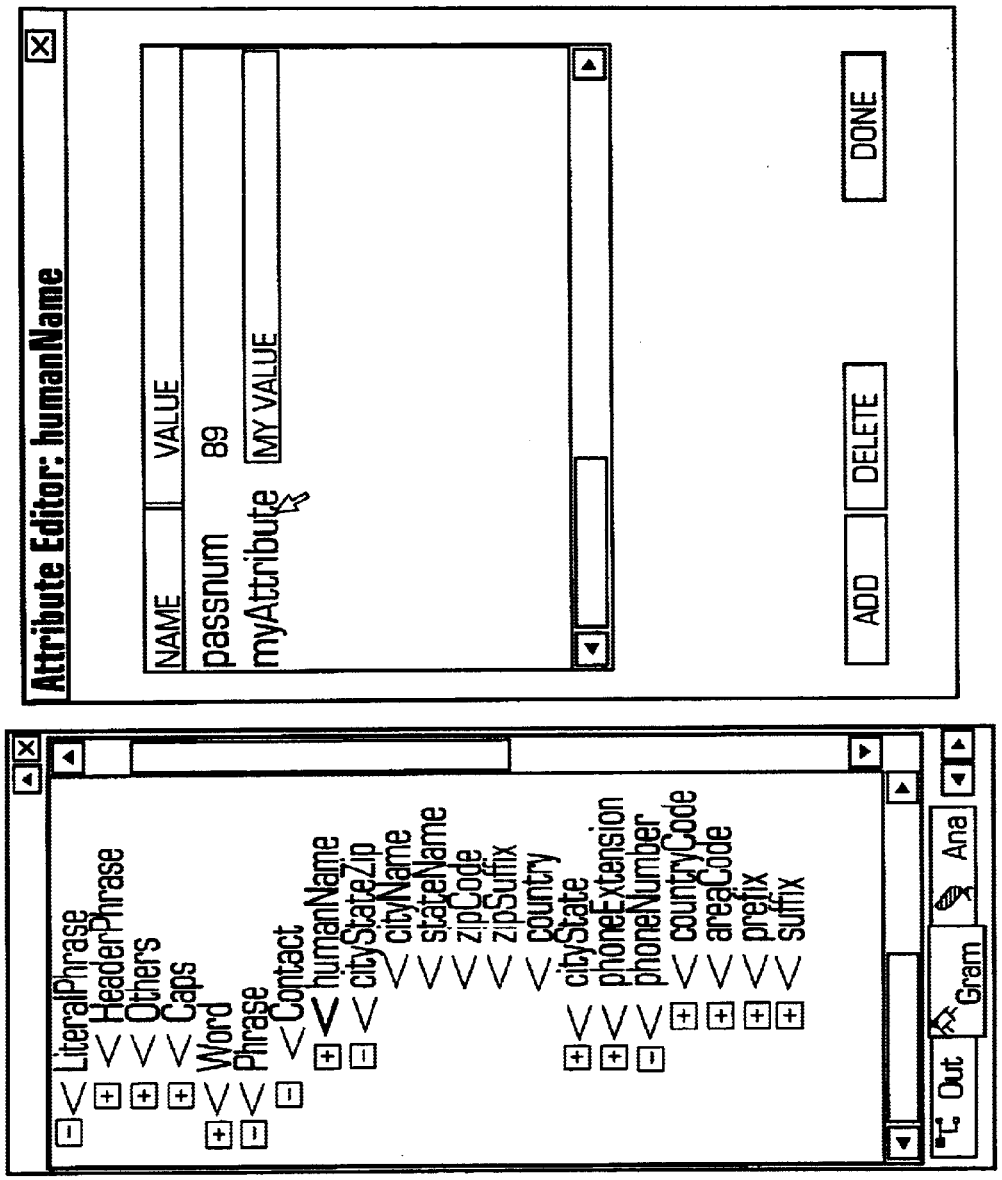
FIG. 17 illustrates the attributes window used in connection with the user interface.

Additional tools associated with the sample hierarchy are the Attribute Window and the Properties Window. The Properties Window 582 (FIG. 16) provides a structured way to control the mode of generating rules for a subhierarchy of the sample hierarchy. The Attribute Window 584 (FIG. 17) is a lower level interface to attributes, enabling the user to add attributes that have not yet been incorporated into the Properties Window 582.

Figure 18:
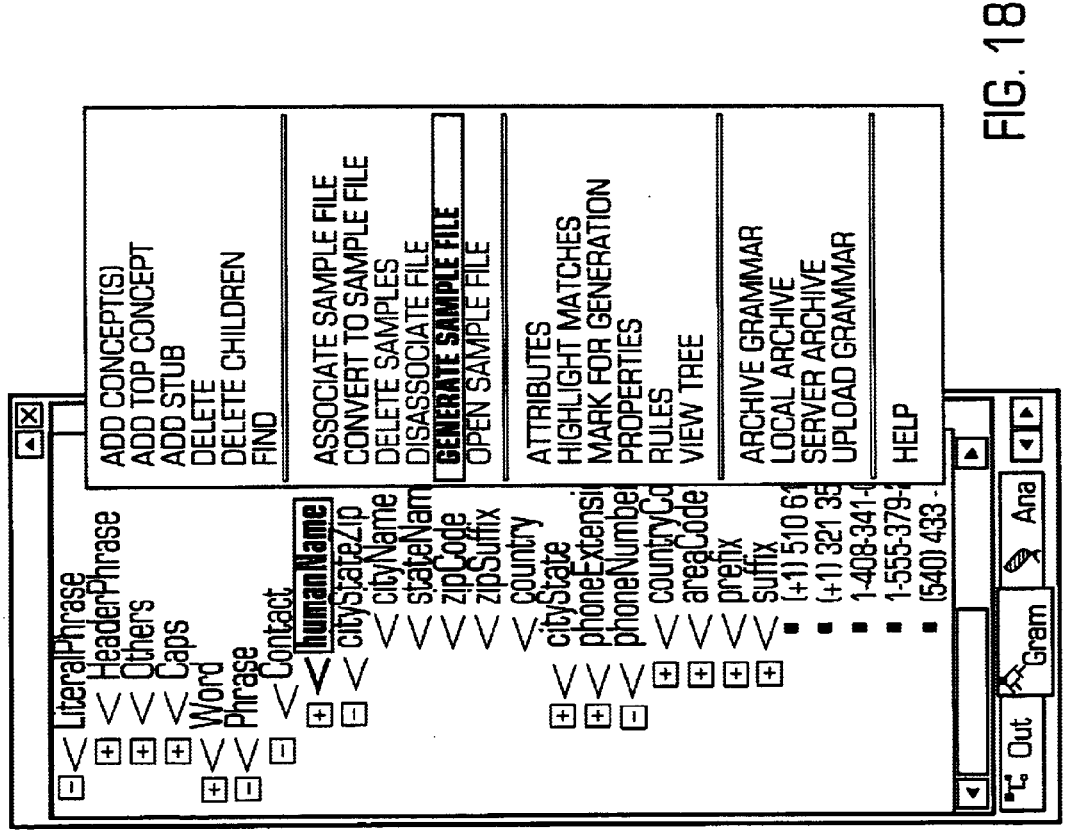
FIG. 18 illustrates a menu incorporated into the sample manager for managing samples and integrating them with the text analyzer development environment.

Sample manager 586 is responsible for bookkeeping to track the file that each sample originated from and the offsets of the sample and its labels within that file. The user may further associate a sample file with any concept in the sample hierarchy. If the user creates such an association, then the system creates copies of samples, their labels, and their offsets in the sample file. Sample files enable faster and more efficient generation of the text analyzer by minimizing the volume of text that must be analyzed to generate the rules for the analyzer. The sample manager 586 enables the user to perform functions such as associating a sample file, dissociating a sample file, opening the associated sample file, deleting the samples under a concept, and similar manipulations. FIG. 18 illustrates a menu incorporated into the sample manager 586 for managing samples and integrating them with the text analyzer development environment. The major capabilities available to the user in the sample manager 586 include:

| FUNCTION | DESCRIPTION |
| --- | --- |
| Add Concept | Add a concept to the sample hierarchy, under selected concept. |
| Add Top Concept | Add a top-level concept to the sample hierarchy. |
| Add Stub | Add a top-level concept and link it to a region of the text analyzer sequence. |
| Delete | Delete the selected item in the sample hierarchy. |
| Delete Children | Delete the children of the selected concept. |
| Find | Find the selected concept or sample by name. |
| Associate Sample File | Associate a sample file with the selected concept. |
| Convert to Sample File | Write the samples under selected concept to a sample file. |
| Delete Samples | Delete the samples under selected concept. |
| Disassociate File | Disassociate the sample file from the selected concept. |
| Generate Sample File | Generate sample file for selected concept. |
| Open Sample File | Open a sample file for study or editing |
| Attributes | Bring up the Attribute Window. |
| Highlight Matches | Show where a concept's rules have matched an analyzed text. |
| Mark for Generation | Mark concept for quick generation of rules (i.e., generate dirty). |
| Properties | Bring up the Properties Window. |
| Rules | Edit or view the Rule File generated for the selected concept. |
| View Tree | View the parse tree due to selected concept's rules (for analyzed text). |
| Archive Grammar | Store the sample hierarchy in the local archive. |
| Local Archive | View the local archive. |
| Server Archive | View the remote archive. |
| Upload Grammar | Store the sample hierarchy in the remote archive. |

The left panel 590 in FIG. 19 illustrates the automatically generated passes in the analyzer sequence, corresponding to the Phrase Stub 588 of FIG. 18. The right panel 592 shows the selected file, phoneNumber, within the stub region.

We have described a system, method, and computer readable medium for generating text analyzers from samples. The users of a text analyzer need not understand how rules are generated in order to maintain and enhance the capabilities of the text analyzer. Nonprogrammer and nonlinguist users can add samples that the text analyzer does not identify, in order to expand the processing power of the text analyzer. While the present invention has been illustrated and described in detail, it is to be understood that numerous modifications may be made to the preferred embodiment without departing from the spirit of the invention.

What is claimed is:

1. A method for generating a text analysis program for recognizing patterns appearing in text and extracting information from said patterns, the method comprising the steps of
   (a) providing a sample hierarchy, said sample hierarchy comprising samples of text wherein the samples are associated with offset values, said offset values identifying locations in a parse tree data structure, said parse tree containing concepts stored at locations identified by said offsets;
   (b) extracting at least one rule from said sample hierarchy, said rule describing how to process a portion of text;
   (c) generating a pass from said rule, said pass containing instructions to operate a text analyzer; and
   (d) constructing a text analyzer containing said pass.

2. The method of claim 1, further comprising the step of allowing a user to designate properties associated with said rules, said properties controlling rule generation for a portion of the sample hierarchy.

3. The method of claim 1, wherein said concepts are retrieved from said parse tree and processed to form said rule.

4. A computer readable medium containing instructions which, when executed by a computer, generate a text analysis program for recognizing patterns appearing in text and extracting information from said patterns, by:
   (a) providing a sample hierarchy, said sample hierarchy comprising samples of text, wherein the samples are associated with offset values, said offset values identifying locations in a parse tree data structure, said parse tree containing concepts stored at locations identified by said offsets;
   (b) extracting at least one rule from said sample hierarchy, said rule describing how to process a portion of text;
   (c) generating a pass from said rule, said pass containing instructions to operate a text analyzer; and
   (d) constructing a text analyzer containing said pass.

* * * * *